(12) United States Patent
Nguyen

(10) Patent No.: US 7,205,681 B2
(45) Date of Patent: Apr. 17, 2007

(54) GENERATION AND DISTRIBUTION OF A DUAL-REDUNDANT LOGIC SUPPLY VOLTAGE FOR AN ELECTRICAL SYSTEM

(75) Inventor: That Nguyen, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 447 days.

(21) Appl. No.: 10/774,251

(22) Filed: Feb. 6, 2004

(65) Prior Publication Data
US 2005/0185352 A1     Aug. 25, 2005

(51) Int. Cl.
  H02J 1/10    (2006.01)
  H02J 3/38    (2006.01)
  H02J 7/34    (2006.01)
(52) U.S. Cl. ..................................... 307/18
(58) Field of Classification Search ............ 307/18
See application file for complete search history.

(56) References Cited

U.S. PATENT DOCUMENTS

| | | | |
|---|---|---|---|
| 4,992,672 A | 2/1991 | Norton | 307/10.1 |
| 5,027,002 A | 6/1991 | Thornton | 307/35 |
| 5,563,781 A | 10/1996 | Clauter et al. | 363/124 |
| 5,726,506 A * | 3/1998 | Wood | 307/147 |
| 5,864,225 A | 1/1999 | Bryson | 323/268 |
| 6,092,207 A | 7/2000 | Kolinski et al. | 713/323 |
| 6,198,262 B1 | 3/2001 | Squibb et al. | 323/273 |
| 6,198,325 B1 | 3/2001 | Ang et al. | 327/259 |
| 6,215,342 B1 | 4/2001 | Morrill | |
| 6,856,045 B1 * | 2/2005 | Beneditz et al. | 307/43 |

* cited by examiner

Primary Examiner—Stephen W. Jackson
Assistant Examiner—Carlos Amaya
(74) Attorney, Agent, or Firm—Birch, Stewart, Kolasch & Birch, LLP

(57) ABSTRACT

A power supply device (20) for an electrical system generates a primary logic supply voltage signal and one or more backup logic supply voltage signals from a plurality of sources (22, 24). The primary and backup logic supply voltage signals are distributed throughout the electrical system to provide a redundant logic supply to various components (330).

30 Claims, 7 Drawing Sheets

GENERATION AND DISTRIBUTION OF A DUAL-REDUNDANT LOGIC SUPPLY VOLTAGE FOR AN ELECTRICAL SYSTEM

FIELD OF THE INVENTION

The present invention relates to a redundant power supply and, more particularly, to generating and distributing a redundant logic supply voltage to components of an Electrical Power Distribution System (EPDS) utilizing Solid State Power Controllers (SSPCs).

BACKGROUND OF THE INVENTION

Conventionally, the power supply of an electrical system (e.g., for distributing electrical power on aircraft and other vehicles) utilizes multiple input power sources to provide a single digital logic supply voltage ($V_{cc}$) along with complementary analog supply voltages ($+/-V_{ss}$). Recently, however, such electrical systems are more dependent upon digital circuitry design including microprocessors, microcontrollers, Field Programmable Gate Arrays (FPGAs), etc. Due to the increased reliance on digital technology for vehicle power distribution systems, the failure of the logic supply voltage $V_{cc}$ may result in a shutdown of the entire system.

Furthermore, the electrical power requirements of the new generation of vehicles have significantly changed. For example, in aerospace systems, there has been a shift from predominately mechanical or electromechanical control to predominantly electronic and computer-based control. Thus, Solid State Power Controllers (SSPCs) are replacing contacts and relays for switching electrical power to various components. However, when a single DC power source is supplied to a large number of SSPC channels, the failure of a single SSPC can cause a chain failure affecting the other SSPC channels.

Thus, it would be advantageous to minimize the adverse effects in an electrical power system resulting from the failure of a single digital logic supply voltage ($V_{cc}$) or a single SSPC channel.

SUMMARY OF THE INVENTION

Exemplary embodiments of the present invention provide a redundant logic supply voltage to various components of an electrical system. The redundant logic supply voltages may be generated from different input power sources, to help ensure that each component in the electrical system receives a logic supply despite a loss of a power source for the logic supply, or disturbances on a power line connecting the source to the logic supply.

According to an exemplary embodiment, a redundant power supply card may be configured to receive input voltages from a primary power source and one or more secondary power sources. The power supply card may further include circuitry to convert the input voltages from the primary source and the secondary source(s) into a primary logic supply voltage signal and backup logic supply voltage signal(s), respectively. The primary and backup logic supply voltages may be distributed over redundant power buses to one or more circuit cards in the electrical system.

Another exemplary embodiment of the present invention is directed to a power supply interface for a circuit card in the electrical system for receiving the redundant logic supply voltage signals. Such an interface may include a fault-tolerance module operably connected to the redundant power buses in order to allocate the logic supply voltage signal distributed by one of the buses as the logic supply for components on the circuit card, while allowing the other distributed logic supply voltage to remain idle. According to an exemplary embodiment, the fault-tolerance module has two diodes connected in a logical OR configuration, which is connected to each of the redundant buses. Such a diode configuration may be operable to output the higher of the logic supply voltage signals received from the buses to the components of the circuit card.

Accordingly, by configuring the power supply card to output the primary logic supply voltage signal at a slightly higher voltage level than the backup logic supply voltage signal, the logic voltage supply card may determine which of the input power sources will be used during normal operation to generate the logic supply voltage. In an exemplary embodiment, the redundant logic supply card may be configured to generate the primary logic supply voltage from an AC power source, and generate the backup logic supply voltage from a DC power source, in order to allow an AC generator (e.g., in an aircraft electrical system) to take on the full load of providing the logic supply, rather than requiring a battery to take on this load.

According to an exemplary embodiment, the redundant logic supply voltages may be implemented in an Electrical Power Distribution System (EPDS) that utilizes Solid State Power Controllers (SSPCs), for example, in an aircraft or other vehicle. Such an EPDS may include one or more circuit cards, each of which includes a plurality of SSPC channels. In this embodiment, the redundant power supply interface may include a plurality of AC-DC converters, each of which isolates the logic supply voltage output from the fault-tolerance module to each of the plurality of SSPC channels (or other components). This can prevent a failure in one SSPC channel of a circuit card from creating a chain failure that disables the logic supply voltage for other SSPC channels on the circuit card.

Further advantages and scope of applicability of the present invention will become apparent from the detailed description provided hereinafter. However, it should be understood that the detailed description and specific embodiments therein, while disclosing exemplary embodiments, are provided by way of illustration only.

BRIEF DESCRIPTION OF THE DRAWINGS

A more complete understanding of the present invention will become apparent from the following description taken in conjunction with accompanying drawings, wherein.

DETAILED DESCRIPTION OF EXEMPLARY EMBODIMENTS

The present invention is generally directed to an Electric Power Distribution System (EPDS) in which redundant logic supply voltages are generated and distributed to various components in an electrical system to allow the system to operate properly despite a loss or disturbance in a power source. Such redundant logic supply voltages may be implemented in an EPDS utilizing one or more Solid State Power Controller (SSPC) channels. Accordingly, exemplary embodiments of the present invention may include a power supply interface for a circuit card, such as an SSPC card, to receive redundant logic supply voltage signals.

Figure 1:
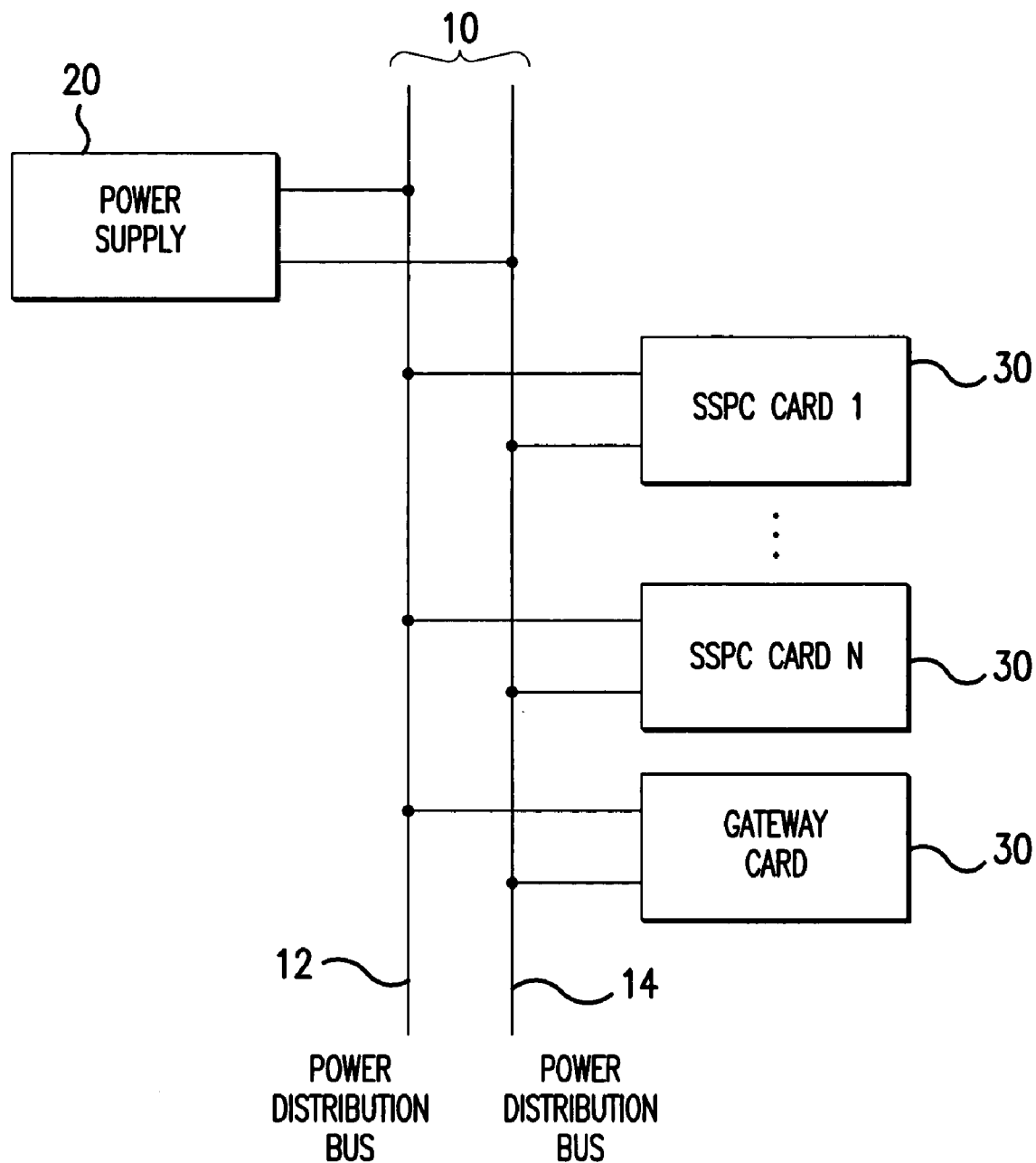
FIG. 1 illustrates various components in an electrical power distribution system (EPDS) utilizing a redundant power supply, according to an exemplary embodiment of the present invention.

FIG. 1 illustrates various components of an EPDS utilizing dual-redundant logic supply voltages, according to an exemplary embodiment of the present invention. In particular, FIG. 1 illustrates a power supply device 20 having dual outputs connected to a power distribution pathway 10. The pathway 10 is comprised of two power distribution buses 12 and 14. The dual power distribution buses 12, 14 are further connected to dual inputs at a plurality of circuit cards 30, which may include multiple SSPC cards 1 . . . n and other types of circuit cards (e.g., a gateway card).

In the system shown in FIG. 1, one of the outputs of the power supply device 20 may produce a primary logic supply voltage signal, which is generated from a primary power source (not shown). The other output may produce a backup logic supply voltage signal generated from a secondary power source (not shown). Accordingly, power distribution bus 12 may be configured to distribute the primary logic supply voltage signal to the various circuit cards 30, and power distribution bus 14 may be configured to distribute the backup logic supply voltage signal to the circuit cards 30. Accordingly, the system in FIG. 1 illustrates a dual-redundant power supply system for providing dual-redundant logic supply voltages to the various components in an electrical system.

Figure 2:
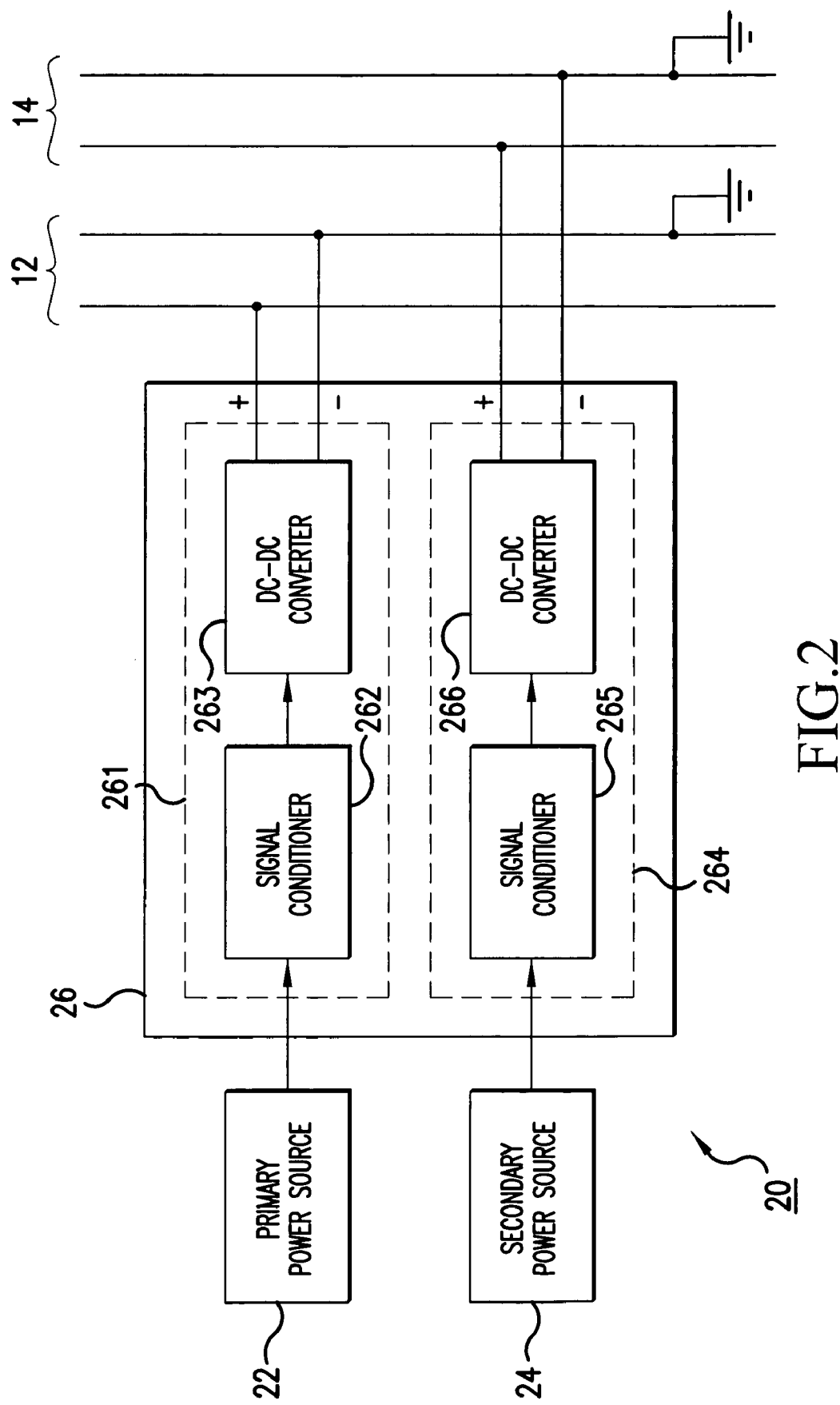
FIG. 2 illustrates a block diagram of a dual-redundant power supply device, according to an exemplary embodiment of the present invention.

FIG. 2 illustrates a block diagram including the various components of the power supply device 20. As shown in FIG. 2, a primary power source 22 and secondary power source 24 are connected to a logic supply device 26, which generates dual-redundant logic supply voltage signals to be distributed over buses 12 and 14. As shown in FIG. 2, the primary power source 22 is connected to a first converting device 261, which converts the voltage signal from the primary power source into the primary logic supply voltage signal sent to bus 12. Similarly, a voltage signal from the secondary power source 24 is input to a second converting device 264, which converts the voltage signal into a backup logic supply voltage signal to be output to bus 14. As shown in FIG. 2, each of the dual power distribution buses 12 and 14 includes a positive connection and a ground connection for distributing their respective logic supply voltage signal.

According to an exemplary embodiment, the first converting device 261 and the second converting device 264 are each operable to convert an input voltage signal into a logic supply voltage signal whose voltage level is equal to, or higher than, a HIGH logic level ($V_{cc}$) corresponding to the digital circuitry in each of the circuit cards 30 connected to buses 12 and 14. For example, the voltage level of $V_{cc}$ may be a DC voltage level of either 3.3 or 5.0 volts. In an exemplary embodiment, the voltage levels of the primary and backup logic supply voltage signals may actually be higher than the $V_{cc}$ voltage level by at least the amount of voltage drop across an ORing diode ($V_{diode}$). The reason for outputting primary and secondary logic supply voltage signals at levels of at least $V_{cc}+V_{diode}$ is related to the diode configuration of the power supply interfaced used at the circuit cards 30. The power supply interface will be described below in more detail in connection with FIGS. 3 and 6.

According to an exemplary embodiment, the first converting device 261 may be configured to output the primary logic supply voltage signal at a level slightly higher than the backup logic supply voltage signal output by the second converting device 264.

According to an exemplary embodiment, the primary and secondary power sources 22 and 24 may each be an AC or DC power source within the electrical system. For example, in an electrical system in an aircraft, the primary power source 22 may be a generator that outputs an AC voltage of 115 VAC at 400 Hz, while the secondary power source 24 comprises of DC voltage 28 VDC or 270 VDC from a battery.

Referring to FIG. 2, an exemplary embodiment of the first converting device 261 includes a signal conditioner 262 and a DC-DC converter 263. The signal conditioner 262 is configured to receive the voltage signal from the primary power source 22 to output a conditioned DC voltage signal to the DC-DC converter 263. For example, if the primary power source 22 is an AC source, the circuitry of the signal conditioner 262 may be comprised of a known circuit configuration for an inverter, i.e., a module for converting an AC signal to a DC signal. For example, the inverter may include circuitry that functions as an auto-ranging rectifier and a filter, according to any one of various implementations known in the art.

When the primary power source 22 is a DC source, the signal conditioner 262 may comprise circuitry for performing various filtering, protection, and conditioning operations on the input voltage signal, as will be readily contemplated by those of ordinary skill in the art.

FIG. 1 shows that the DC-DC converter 263 of the first converting device 261 receives the conditioned DC voltage signal from signal conditioner 262. The DC-DC converter 263 comprises a circuit for converting the voltage level of the input DC signal to one appropriate for the primary logic supply voltage signal (e.g., slightly higher than $V_{cc}+V_{diode}$). The type of DC-DC converter 263 used may be dependent on the primary power source 22. For example, where the primary power source 22 provides a 28 VDC signal, a 28 VDC-5.5 VDC converter may be implemented as the DC-DC converter 263 in order to output the primary logic supply voltage signal at 5.5 VDC. Circuit configurations used for implementing the DC-DC converter 263 will be readily known to those of ordinary skill in the art.

The second converting device 264 is configured to receive the signal from the secondary power source 24 as an input to the signal conditioner 265. Signal conditioner 265 thus converts the input signal to a conditioned DC signal, which is converted by DC-DC converter 266 to produce the backup logic supply voltage signal. The configuration and operation of signal conditioner 265 and DC-DC converter 266 are similar to those of the signal conditioner 262 and DC-DC converter 263 described above, and may not be repeated. However, according to an exemplary embodiment, the DC-DC converter 266 of the second converting device 264 may be configured to output the backup logic supply voltage signal at a slightly lower level than the primary logic supply voltage signal output by DC-DC converter 263. Such an embodiment may allow the primary logic supply voltage signal to be used by a power supply interface within one or more of the circuit cards 30 as the logic supply voltage, while the second logic supply voltage signal remains idle. A more detailed description of such a power supply interface will be provided below in connection with FIG. 3.

Furthermore, the configuration of the second converting device 264 may differ from that in the first converting device 261 based on differences between the secondary power source 24 and the primary power source 22. The dependence of the configuration and operation of signal conditioner 265 and DC-DC converter 266 on the type of secondary power source 24 is similar to that described above with respect to the dependence of the corresponding elements 262 and 263 on the primary power source 22, and need not be repeated here.

According to another exemplary embodiment, power supply device 20 may also be configured to output various monitoring signals (not shown) to report the status of the primary and secondary power sources 22 and 24 based on their respective voltage signals input to the logic supply device 26.

Figure 7:
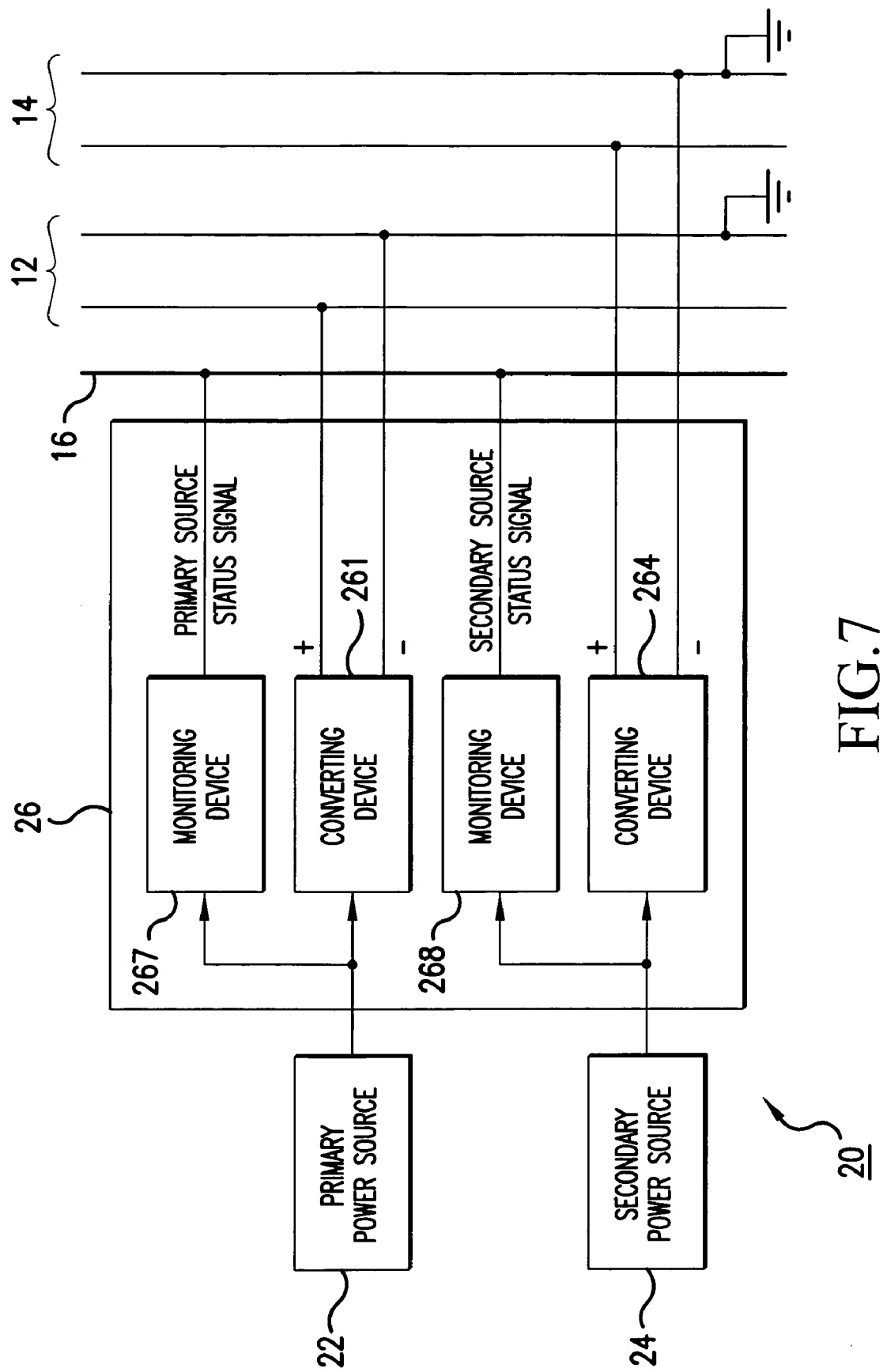
FIG. 7 illustrates a block diagram of a dual-redundant power supply device configured to generate monitoring signals, according to an exemplary embodiment of the present invention.

FIG. 7 illustrates a power supply device 20 configured to generate monitoring signals, according to an exemplary embodiment. FIG. 7 shows a monitoring device 267 and 268 configured to receive the voltages from the primary and secondary power sources 22 and 24, respectively. In response, each monitoring device 267 and 268 is configured to generate a monitoring signal for the corresponding one of power sources 22 and 24.

In an exemplary embodiment, the monitoring signals may be sent to a monitoring device (not shown) connected to the EPDS system via signal bus 16. The monitoring device (not shown) may be operable to output status signals to a user (e.g., a pilot of the aircraft in which the EPDS is implemented). These status signals may be used to indicate to the user the status of the voltage signals output by the primary and secondary power sources 22 and 24, thereby notifying the user regarding the operating status of these power sources 22 and 24.

As shown in FIG. 7, these monitoring signals generated by the redundant power supply device 20 may be derived or taken directly from the voltage signals output by each of the primary and secondary power sources 22 and 24. Alternatively, the monitoring signals may be derived from the primary and backup logic supply voltage signals output from one or more signals generated by the logic supply device 26. Various implementations of a monitoring device using such signals will be readily apparent by those of ordinary skill in the art.

Thus, a redundant power supply device 20 according to various embodiments of the present invention may be used to provide the added feature of notifying the user when a problem (loss, disturbance, etc.) of one of the power sources in the electrical system has occurred.

Figure 3:
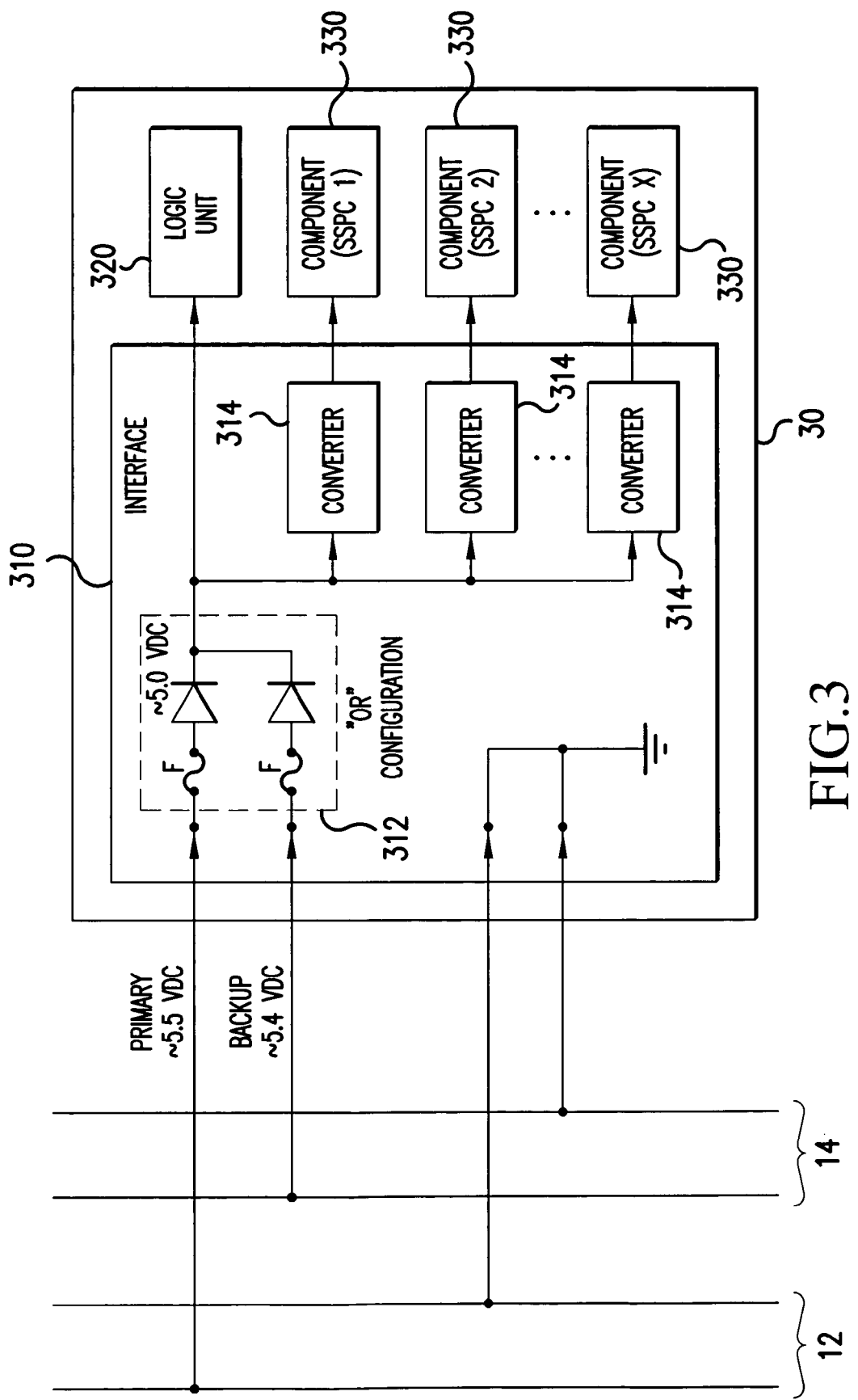
FIG. 3 illustrates a block diagram of a dual-redundant power supply interface for a circuit card, according to an exemplary embodiment of the present invention.

FIG. 3 illustrates a block diagram of a dual-redundant power supply interface for a circuit card 30, according to exemplary embodiments of the present invention. In FIG. 3, the circuit card 30 includes a power supply interface 310, which receives the primary and backup logic supply voltage signals from buses 12 and 14, respectively. The power supply interface 310 is configured to allocate, or output, one of the received primary and backup logic supply voltage signals as the logic supply for digital circuitry in card 30. Such digital circuitry includes a logic unit 320 and other components 330, as shown in FIG. 3. According to an exemplary embodiment, the circuit card 30 may be an SSPC card, whose components 330 include a plurality of SSPC channels 1 . . . x.

According to exemplary embodiments illustrated by FIG. 3, the logic unit 320 and the various components 330 may comprise digital circuitry whose HIGH logic level ($V_{cc}$) equals 5.0 volts. In such an embodiment, the dual-redundant power supply may include a primary logic supply voltage signal of approximately 5.5 VDC, while the backup logic supply voltage signal corresponds to a level of 5.4 VDC.

Referring to FIG. 3, the power supply interface 310 includes two input nodes each configured to receive a corresponding one of the primary and backup logic supply voltage signals. Each input node is connected to a fault-tolerance module 312, which is configured to allocate one of the primary and backup logic supply voltage signals from the input nodes as a logic supply voltage for card 30.

FIG. 3 shows a particular exemplary embodiment where the fault-tolerance module includes two ORing diodes in a logical OR configuration. In this OR configuration, the anode of a first ORing diode is connected to the input node receiving the primary logic supply voltage signal. The anode of the second ORing diode is connected to the other input node, which receives the backup logic supply voltage signal. The cathodes of both ORing diodes are connected to the output node of the OR configuration. Based on the connections of the first and second ORing diodes, the higher of the primary and secondary logic supply voltage signals will be applied to the output node of the OR configuration, and thereby allocated as the logic supply voltage for the card 30.

As shown in FIG. 3, the fault tolerance module 312 includes a fuse F disposed between each input node and the anodes of the first and second diodes of the OR configuration, respectively. According to an alternative embodiment, these fuses F may be placed between the cathodes of the respective ORing diodes and the output node of the OR configuration. These fuses F provide an additional fail-safe mechanism for the electrical system to prevent a short circuit in one circuit card 30 from affecting other circuit cards 30 in the electrical system.

Take, for example, the situation where a particular circuit card 30 suffers a short circuit in the first diode of the OR configuration due to an overload in current. In this situation, the fuse F connected to the first diode will blow (resulting in an opening in the connection). Thus, OR configuration will allocate the backup logic supply voltage signal to the load (components 330) of the particular card 30. However, the presence of open fuse F prevents the entire primary logic supply from shorting, thereby allowing the other circuit cards 30 to allocate the primary logic supply voltage signal to their respective loads.

Furthermore, the connection of the other fuse F to the second ORing diode will prevent shorts in both ORing diodes of a particular card 30 from shorting either the primary or backup power logic supplies.

According to an exemplary embodiment, the fuses F may be comprised of electrically resettable fuses. Such fuses may be reset by applying an electrical "reset" signal. Alternatively, conventional fuses may be implemented as the fuses F in fault tolerance module 312. When conventional fuses F are used, a monitor circuit may also be implemented in fault tolerance module 312 to monitor the status of each fuse F. In this embodiment, the monitor circuit may alert an operator that a conventional fuse F has blown and must be replaced.

In an exemplary embodiment, Schottky diodes may be utilized as the first and second ORing diodes of the OR configuration. In alternative embodiments, other types of ORing diodes may be utilized as will be contemplated by those of ordinary skill in the art.

If, as described in above embodiments, the primary and backup logic supply voltage signals are approximately equal to $V_{cc}+V_{diode}$ (i.e., the HIGH logic level plus the voltage drop of an ORing diode), the output of the OR configuration in fault-tolerance module 312 will be approximately equal to $V_{cc}$. This is due to the use of ORing diodes in the OR configuration.

Furthermore, if the primary logic supply voltage signal is designed to have a slightly higher level than the backup logic supply voltage signal, the fault-tolerance module 312 of FIG. 3 should consistently choose the primary logic supply voltage signal to be output as the logic supply voltage for the card 30, at least until the primary logic supply voltage source becomes disabled (e.g., by a loss or disturbance in the primary power source 22). FIG. 3 illustrates a particular exemplary embodiment where the primary logic supply voltage signal is approximately 5.5 VDC, while the backup logic supply voltage signal is approximately 5.4 VDC, thus allowing the fault-tolerance module 312 to output a logic supply voltage of 5.0 VDC (assuming $V_{diode}$ is approximately 0.5V) as the logic supply voltage for the circuit card 30.

The power supply interface 310 may be configured to send the logic supply voltage allocated by the fault-tolerance module 312 directly to components on the circuit card 30, such as the logic unit 320. The power supply interface 310 may further include converters 314 that are configured to receive and convert the logic supply voltage from fault-tolerance module 312 to a signal suitable for other components 330, such as SSPC channels 1 ... x. For instance, the converters 314 may include DC-DC converters designed to convert a 5 VDC logic supply voltage to a 15 VDC power signal for a corresponding SSPC channel.

Furthermore, each converter 314 may be configured to electrically isolate its corresponding component 330 from other components 330 in the circuit card 30. For example, if the circuit card 30 is an SSPC card, the set of converters 314 may be operable to isolate each SSPC channel 1 ... x so that a failure in one SSPC channel does not create a chain failure in the other channels. For example, each converter 314 may be implemented as a 1-Watt, 5 VDC/15 VDC DC-DC converter connected to a corresponding one of the SSPC channels 1 ... x.

The use of the OR configuration, in conjunction with a separate converter 314 for each SSPC channel 1 ... x, provides several advantages, including galvanically isolating each SSPC channel 1 ... x and allowing each SSPC channel to share equally in the output current of the logic supply voltage. Since regulation by the converters 314 takes place at or near the respective loads of the circuit card 30, the lengths of the output leads may be minimized, thereby reducing inductants and improving transient response.

Furthermore, the configuration illustrated in FIG. 3 allows each converter 314 to be placed as close as possible to a corresponding SSPC channel 1 ... x, which reduces problems concerning voltage regulation, noise generation and pickup, and dynamic response.

Figure 4:
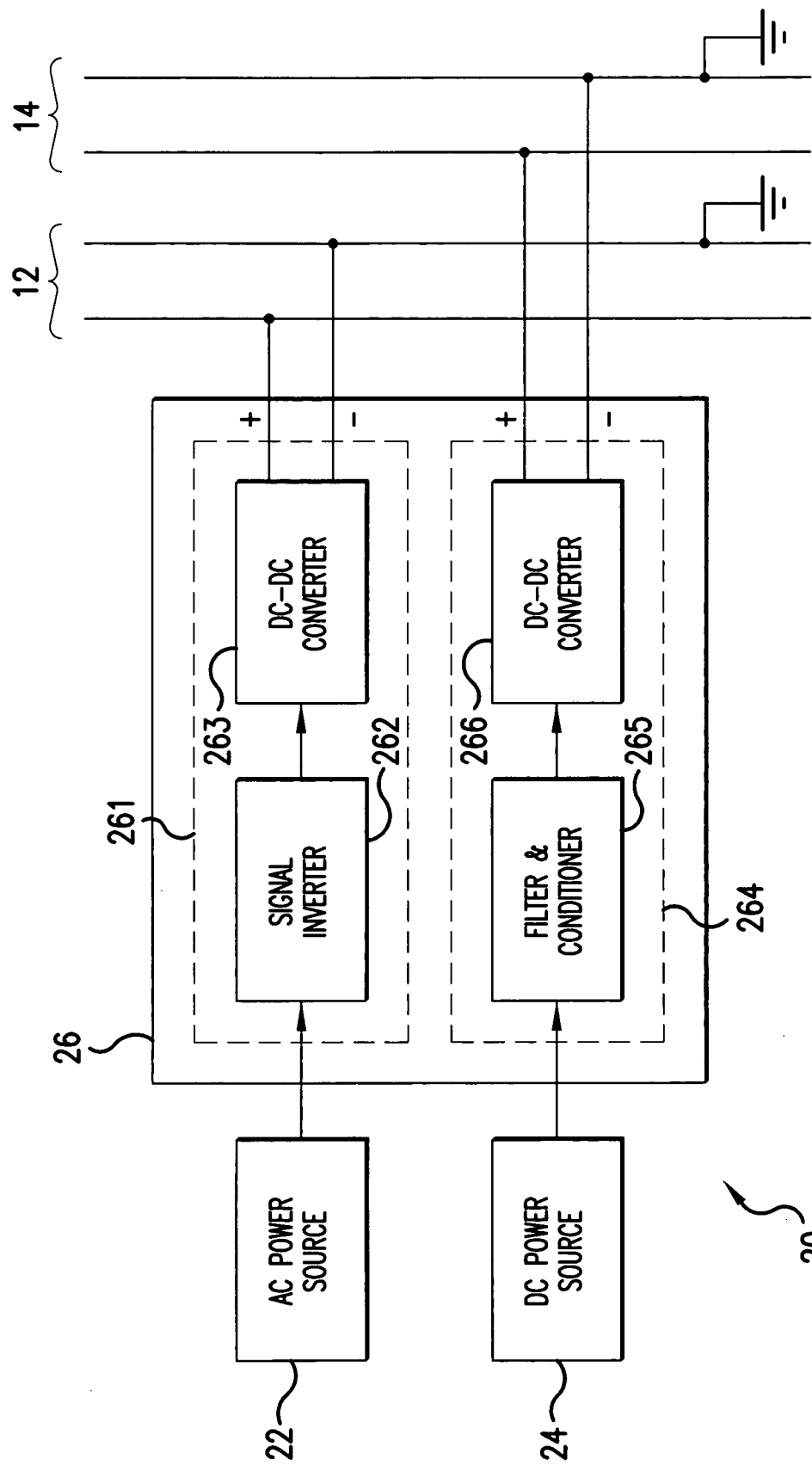
FIG. 4 illustrates a block diagram of a dual-redundant power supply device utilizing an AC and DC power source, according to an exemplary embodiment of the present invention.

FIG. 4 illustrates a further exemplary embodiment of the present invention. In particular, FIG. 4 illustrates a block diagram of a dual-redundant power supply device 20 that utilizes an AC power source 22 to generate the primary logic supply voltage signal, and a DC power source 24 to generate the backup logic supply voltage signal.

As shown in FIG. 4, the first converting device 261 includes a signal inverter 262, which is comprised of an auto-ranging rectifier and filter module, for generating a conditioned DC voltage signal. FIG. 4 further shows that the conditioned DC signal from signal inverter 262 is sent to a DC-DC converter 263. In an exemplary embodiment where the AC power source 22 is a 115 VAC source (e.g., an aircraft generator), the conditioned DC signal may be output from signal inverter 262 as a 300 VDC signal due to full wave amplification. In such an embodiment, the DC-DC converter 263 in the first converting device 261 may be configured as a 300 VDC-5.5 VDC converter (assuming that $V_{cc}=5.0$ volts).

As further shown in FIG. 4, the second converting device 264 is operable to convert the DC power source 24 as the backup logic supply voltage signal. The signal conditioner 265 may be configured as a signal filter and conditioner that outputs, for example, a 28 VDC signal. Accordingly, the DC-DC converter 266 may be configured to convert 28 VDC signals to an appropriate DC signal for the backup logic supply voltage signal (e.g., 5.4 VDC).

However, various modifications in the configurations of the above-described AC and DC power sources 22 and 24, as well as the components of the first and second converting devices 261 and 264, may be made to the power supply device 20 of FIG. 4 without departing from the spirit and scope of the present invention.

Figure 5:
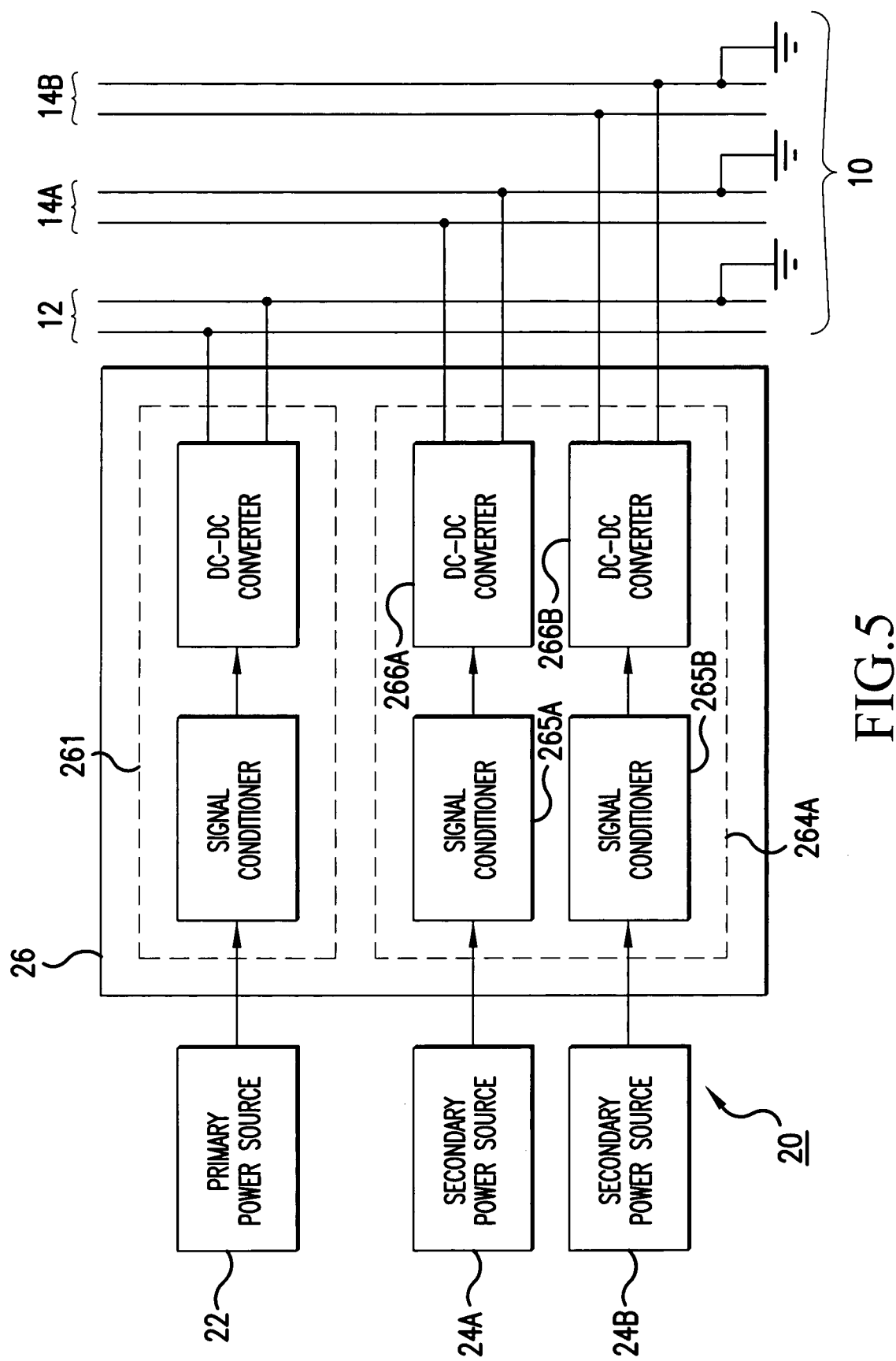
FIG. 5 illustrates a block diagram of a redundant power supply device utilizing multiple secondary power sources to produce multiple backup logic supply voltage signals, according to an exemplary embodiment of the present invention.

According to another exemplary embodiment, multiple backup logic supply voltage signals may be generated by the redundant power supply device 20 using multiple secondary power sources. FIG. 5 illustrates a block diagram of a power supply device 20 that receives signals from a primary power source 22 and two secondary power sources 24a and 24b, in order to generate a primary logic supply voltage signal and two backup logic supply voltage signals.

As shown in FIG. 5, the redundant power distribution pathway 10 may include three power distribution buses 12, 14a and 14b. In particular, power distribution buses 14a and 14b may be used to distribute the backup power logic supply voltage signals generated using secondary power sources 24a and 24b, respectively.

In FIG. 5, the first converting device 261 is configured similarly to the corresponding device illustrated in FIG. 2, and thus follows a similar principle of operation. Accordingly, the configuration and principle of operation of the first converting device 261 in FIG. 5 need not be repeated here.

However, the second converting device 264a shown in FIG. 5 has a different configuration than the second converting device 264 illustrated in FIG. 2. Particularly, the second converting device 264a includes a signal conditioner 265a and DC-DC converter 266a for generating a backup logic supply voltage signal from the secondary power source 24a. The second converting device 264a further includes another signal conditioner 265b and DC-DC converter 266b for generating another backup logic supply voltage signal using secondary power sources 24b.

Each connected set of signal conditioner 265a/265b and DC-DC converter 266a/266b in FIG. 5 has a similar configuration and principle of operation as described above with respect to the signal conditioner 265 and DC-DC converter 266 in FIG. 2. Accordingly, such description need not be repeated here.

In a further exemplary embodiment, where more than two backup logic supply voltage signals are to be generated by the power supply device 20, the second converting device 264a in FIG. 5 may be modified to include additional sets of a signal conditioner and a DC-DC converter, each set being configured to generate a distinct backup logic supply voltage signal from a corresponding secondary power source. In such an embodiment, the power distribution pathway 10 may include an additional bus to distribute each additional backup logic supply voltage signal.

According to an exemplary embodiment, the first converting device 261 shown in FIG. 5 may be configured to output a primary logic supply voltage signal that is slightly higher than the multiple backup logic supply voltage signals produced by the second converting device 264a. Accordingly, this may facilitate the primary logic supply voltage signal to be allocated as the logic supply voltage in a circuit card 30 according to an exemplary embodiment, which will be described in more detail below.

Figure 6:
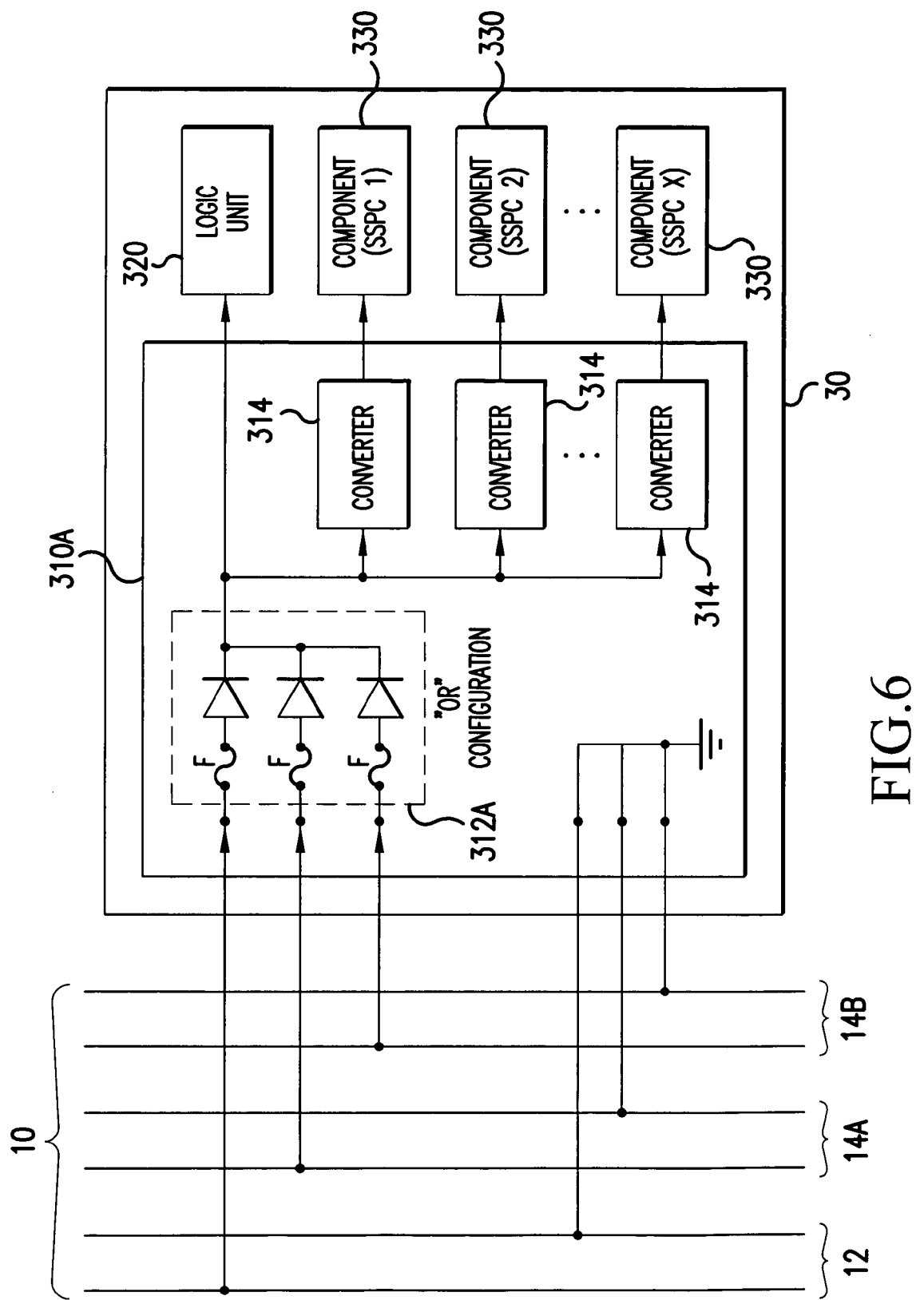
FIG. 6 illustrates a block diagram of a redundant power supply interface for a circuit card receiving multiple backup logic supply voltage signals, according to an exemplary embodiment of the present invention.

FIG. 6 illustrates a block diagram of a power supply interface 310a for a circuit card 30, which is configured to receive a primary logic supply voltage signal and multiple backup logic supply voltage signals from a power supply device 20 (as illustrated in FIG. 5).

The configuration of the power supply interface 310a in FIG. 6 differs from that in the power supply interface 310 illustrated in FIG. 3. In particular, the power supply interface 310a of FIG. 6 includes an additional input node for receiving an additional backup logic supply voltage signal. Also, the power supply interface 310a has an OR configuration in its fault-tolerance module 312a, that differs from fault tolerance module 312 in FIG. 3.

As shown in FIG. 6, the fault-tolerance module 312a includes an additional ORing diode whose anode receives the voltage signal from power distribution bus 14b via the third input node. The cathode of this additional ORing diode is commonly connected to the cathodes of the other diodes at the output node.

The operation of the OR configuration in FIG. 6 essentially remains the same as that in FIG. 3, in that the highest of the voltages applied to the input nodes will be sent to the output node of the fault-tolerance module 312a, in order to be allocated as a logic supply voltage for the circuit card 30. In addition, the fuses F provide a fail-safe mechanism as described above with respect to FIG. 3.

Thus, when the primary logic supply voltage signal provided on distribution bus 12 is slightly higher than the backup logic supply voltage signals provided on buses 14a and 14b, the fault-tolerance module 312a is configured to allocate the primary logic supply voltage signal as a logic supply voltage for circuit card 30.

It should be noted that the OR configuration of fault-tolerance module 312a may be modified to receive additional backup logic supply voltage signals from additional power distribution buses. Specifically, an additional ORing diode may be added to the OR configuration to receive each additional backup logic supply voltage signal. The anode of each additional ORing diode may be connected to a corresponding bus on pathway 10, while the ORing diode's cathode is connected to the output node of the fault-tolerance module similar to the other ORing diodes.

In the OR configuration of FIG. 6, a Schotky diode may be used for each of the ORing diodes. However, other types of ORing diodes, as will be contemplated by those of ordinary skill in the art, may be used in alternative embodiments.

In exemplary embodiments described above, the primary logic supply voltage signal has a slightly higher level than the backup logic supply voltage signal(s). Such embodiments allow the primary logic supply voltage signal to be allocated as a logic supply voltage of a circuit card 30, while the backup logic supply voltage signals remain idle until the primary logic supply voltage signal becomes disabled, e.g., by loss, interruption, etc. However, the present invention is not limited to such embodiments.

In an alternate exemplary embodiment, the power supply device 20 may be configured to output the primary logic supply voltage signal at a same voltage level as the backup logic supply voltage signal(s). In such an embodiment, each circuit card 30 may utilize an OR configuration (as illustrated in FIGS. 3 and 6) to allow each of the logic supply voltage signals distributed over pathway 10 to share the power load of the logic unit 320 and the various components 330.

What is claimed is:

1. A redundant power supply device for an electrical system, comprising:
   a first converting device configured to convert a first input voltage signal into a primary logic supply voltage signal;
   a second converting device configured to convert a second input voltage signal into a backup logic supply voltage signal;
   a first output configured to output the primary logic supply voltage signal to one or more components in the electrical system; and
   a second output configured to output the backup logic supply voltage signal to the one or more components in the electrical system,
   wherein the first and second converting devices are configured so that the voltage level of the primary logic supply voltage signal is higher than the backup logic supply voltage signal.

2. The redundant power supply device according to claim 1, wherein
   the components of the electrical system include one or more circuit cards utilizing digital circuitry, and
   each of the first and second converting devices is configured to convert a respective input voltage into a logic supply voltage signal that is compatible with logic levels associated with the digital circuitry of each circuit card.

3. The redundant power supply device according to claim 1, wherein the first and second converting devices are configured so that voltage levels of the primary and backup logic supply voltages are substantially equal to $V_{cc}+V_{diode}$, wherein $V_{cc}$ is a voltage level associated with a HIGH logic level for digital circuitry in each circuit card, and
   $V_{diode}$ is a voltage drop across an ORing diode in each circuit card.

4. The redundant power supply device according to claim 1, wherein each of the first and second converting devices include
   a signal conditioner configured to receive an input voltage signal and output a conditioned DC voltage signal; and
   a DC-DC converter operably connected to the signal conditioner to convert the voltage level of the conditioned DC voltage signal, thereby generating a logic supply voltage signal.

5. The redundant power supply device according to claim 4, wherein the first and second converting devices are configured so that a voltage level of the primary logic supply voltage signal is higher than a voltage level of the backup logic supply voltage signal.

6. The redundant power supply device according to claim 5, wherein
the first input voltage signal is an AC voltage signal and the second input voltage signal is a DC voltage signal, and
the signal conditioner of the first converting device includes an auto-ranging rectifier and filter.

7. The redundant power supply device according to claim 1, further comprising:
a monitoring device configured to output a signal indicating a status of each of the first and second input voltage signals.

8. The redundant power supply device according to claim 1, wherein the second converting device is configured to convert one or more input voltage signals, which are received in addition to the second input voltage signals, into backup logic supply voltage signals that are distributed to the components of the electrical system.

9. A dual-redundant power supply interface for a circuit card, comprising:
a first input node configured to receive a first voltage signal supplied to the circuit card;
a second input node configured to receive a second voltage signal supplied to the circuit card; and
a fault-tolerance module operably connected to the first and second input nodes, the fault-tolerance device being configured to allocate one of the first and second voltage signals as a logic supply voltage of the circuit card, while the other of the first and second voltage signals remains idle,
wherein the fault tolerance module is configured to allocate the one of the first and second voltage signals as the logic supply voltage based on a difference in voltage levels between the first and second voltage signals.

10. The dual-redundant power supply interface according to claim 9, wherein
the first voltage signal has a higher voltage level than the second voltage signal, and
the fault-tolerance module is configured to allocate the first voltage signal as the logic supply voltage, while the second voltage signal remains idle.

11. The dual-redundant power supply interface according to claim 10, wherein
the fault-tolerance module is configured to allocate the second voltage signal as the logic supply voltage when the first voltage signal becomes disabled.

12. The dual-redundant power supply interface according to claim 10, wherein the fault-tolerance module includes two diodes connected in a logical OR configuration.

13. The dual-redundant power supply interface according to claim 12, wherein the fault-tolerance module has a configuration including,
a first ORing diode whose anode receives the first voltage supply signal,
a second ORing diode whose anode receives the second voltage signal,
an output node at which the cathodes of the first and second ORing diodes are commonly connected, the output node outputting the logic supply voltage to one or more components of the circuit card.

14. The dual-redundant power supply interface according to claim 13, further comprising:
one or more fuses, each connected in series with the first or second ORing diodes.

15. The dual-redundant power supply interface according to claim 13, wherein the first and second ORing diodes are Schottky diodes.

16. The dual-redundant power supply interface according to claim 15, wherein at least one of the components of the circuit card is a digital logic device.

17. The dual-redundant power supply interface according to claim 9, wherein
the circuit card includes digital circuitry, each of the first and second voltage signals being a DC signal whose voltage level is compatible with logic levels associated with the digital circuitry, and
the dual-redundant power supply interface further comprises:
one or more converters operably connected to the fault-tolerance module to receive the logic supply voltage, each converter being configured to convert the logic supply voltage and deliver the converted logic supply voltage to an operably connected component of the circuit card.

18. The dual-redundant power supply interface according to claim 17, wherein each converter is configured to electrically isolate the operably connected component from the components operably connected to the other converters.

19. The dual-redundant power supply interface according to claim 18, wherein at least one of the converters is a 1-Watt, 5–15V DC-DC converter configured to deliver the converted logic supply to a solid-state power controller (SSPC).

20. An electrical power distribution system comprising:
a power supply device for generating redundant DC supply voltages from a plurality of power sources;
redundant power distribution buses operably connected to the power supply device to distribute the redundant DC supply voltages; and
one or more circuit cards, each including,
a digital logic device; and
an interface operably connected to the redundant power distribution buses to receive the redundant DC supply voltages, wherein the interface is configured to allocate one of the redundant DC supply voltages as a logic supply voltage for the digital logic device based on a difference in voltage levels between the redundant DC supply voltages.

21. The system according to claim 20, wherein the power supply device includes,
a first converting device configured to condition and convert a first input voltage signal into a primary logic supply voltage;
a second converting device configured to condition and convert a second input voltage signal into a backup logic supply voltage,
wherein the primary and backup logic supply voltages have voltage levels compatible with the logic levels associated with the digital logic device, the voltage level of the primary logic supply voltage being higher than the voltage level of the backup logic supply voltage.

22. The system according to claim 21, wherein the first and second converting devices each include a DC-DC converter.

23. The system according to claim 22, wherein
the first input voltage signal is an AC signal and the second input voltage signal is a DC signal, and
the first converting device includes an auto-ranging rectifier and filter operably connected to the DC-DC converter.

24. The system according to claim 20, wherein
the redundant DC supply voltages include a first and second DC supply voltage, the first DC supply voltage having a higher voltage level than the second DC supply voltage, and
the interface includes a fault-tolerance module operably connected to receive the first and second DC supply voltages from the power distribution buses, the fault-tolerance device being configured to allocate the first DC supply voltage as the logic supply voltage, while allowing the second DC supply voltage to remain idle.

25. The system according to claim 24, wherein the fault tolerance module includes two diodes connected in a logical OR configuration.

26. The system according to claim 25, wherein the interface further comprises:
a fail-safe mechanism operable to protect the first and second DC supply voltages when a short circuit occurs in the diodes of the logical OR configuration, the fail-safe mechanism including a fuse connected in series with each of the diodes, respectively.

27. The system according to claim 25, wherein the diodes are Schottky ORing diodes.

28. The system according to claim 24, wherein the fault-tolerance module is further configured to allocate the second DC supply voltage as the logic supply voltage when the first DC supply voltage becomes disabled.

29. The system according to claim 24, wherein each circuit card includes one or more solid-state power controllers (SSPCs), wherein the interface includes,
one or more DC-DC converters operably connected to the fault tolerance module to receive the allocated logic supply voltage, each DC-DC converter being configured to deliver a converted DC power source voltage to a corresponding one of the SSPCs.

30. The system according to claim 20, including a status monitoring module configured to output a signal indicating a status of each of the plurality of power sources.

* * * * *